(12) United States Patent
Elenes et al.

(10) Patent No.: US 9,780,816 B1
(45) Date of Patent: Oct. 3, 2017

(54) REMOVING IMPULSIVE NOISE IN A RADIO

(71) Applicant: Silicon Laboratories Inc., Austin, TX (US)

(72) Inventors: Javier Elenes, Austin, TX (US); Dana Taipale, Austin, TX (US); Alex Hakkola, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 15/086,236

(22) Filed: Mar. 31, 2016

(51) Int. Cl.
*H04B 1/10* (2006.01)
*H04L 27/14* (2006.01)

(52) U.S. Cl.
CPC .............. *H04B 1/10* (2013.01); *H04L 27/14* (2013.01)

(58) Field of Classification Search
CPC .. H04L 25/0038; H04L 27/2647; H04N 5/213
USPC ........ 375/350, 232, 346; 348/441, 452, 607; 455/218, 223
See application file for complete search history.

(56) References Cited

U.S. PATENT DOCUMENTS

| | | | |
|---|---|---|---|
| 8,774,328 B2 | 7/2014 | Elenes et al. | |
| 9,001,945 B2 | 4/2015 | Elenes et al. | |
| 9,118,533 B2 | 8/2015 | Elenes et al. | |
| 9,419,661 B2* | 8/2016 | Lo | H04B 1/1036 |
| 2007/0165753 A1* | 7/2007 | Yang | H03K 5/1252 375/346 |
| 2008/0261549 A1* | 10/2008 | Altizer | H03G 3/345 455/223 |
| 2009/0298453 A1 | 12/2009 | Elenes | |
| 2010/0040181 A1* | 2/2010 | Lin | H04N 5/213 375/350 |
| 2015/0102846 A1* | 4/2015 | Dinh | H03K 5/159 327/161 |
| 2015/0110228 A1 | 4/2015 | Elenes et al. | |

OTHER PUBLICATIONS

Silicon Labs, "High-Performance Automotive AM/FM Radio Receiver and HD Radio™/DAB/DAB+/DMB/DRM Tuner," Mar. 12, 2015, 3 pages.
Silicon Labs, "High-Performance Automotive AM/FM Radio Receiver and HD Radio™/DAB/DAB+/DMB/DRM Tuner with Audio System," Mar. 12, 2015, 3 pages.

* cited by examiner

*Primary Examiner* — Khai Tran
(74) *Attorney, Agent, or Firm* — Trop, Pruner & Hu, P.C.

(57) ABSTRACT

In one example, an apparatus includes: a delay unit to delay a demodulated signal obtained from an input radio frequency (RF) frequency modulation (FM) signal; a filter to filter the demodulated signal and output a filtered demodulated signal; an impulse detection circuit to receive the filtered demodulated signal and detect presence of an impulse in the demodulated signal; and an impulse removal circuit to remove the detected impulse from the demodulated signal.

17 Claims, 6 Drawing Sheets

REMOVING IMPULSIVE NOISE IN A RADIO

BACKGROUND

Radio receivers operate by receiving and processing an incoming radio frequency (RF) signal obtained from an antenna. Such processing includes performing analog front-end processing on the signal and downconverting the signal to a lower frequency signal. After downconverting the signal to a desired frequency range, additional processing is performed that results in a demodulated signal that can be output as desired audio signal. Different demodulation schemes are possible depending upon the type of received signal.

For frequency modulated (FM) signals, message content is modulated by way of modulating the frequency of the carrier signal with the message content. As such, on a receive end, a demodulator operates by a determining the modulation frequency to recover the original message content.

An FM demodulator operates on a received complex signal by calculating a change in angle over time. At low signal-to-noise ratio, additive noise can result in changes in the angle over time, which produce unwanted impulses in the demodulated signal. However, existing derivative-based impulse detection has some limitations. Example detectors do not completely remove the signal component and thus can false trigger in the presence of large undesired signals (large frequency deviation).

To remove impulsive noise, existing techniques typically are based on first and higher-order derivatives of the demodulator output to detect impulses. If the derivative is higher than a threshold, then affected samples are blanked and/or replaced using interpolation or extrapolation from adjacent samples. However, existing derivative-based impulse detection has some limitations.

SUMMARY OF THE INVENTION

In one aspect, an apparatus comprises: a delay unit to delay a demodulated signal obtained from an input radio frequency (RF) frequency modulation (FM) signal; a filter to filter the demodulated signal and output a filtered demodulated signal; an impulse detection circuit to receive the filtered demodulated signal and detect presence of an impulse in the demodulated signal; and an impulse removal circuit to remove the detected impulse from the demodulated signal.

The filter may be a linear phase high pass filter to filter a signal portion of the demodulated signal and output an impulse portion of the demodulated signal. In such example, the impulse removal circuit comprises a summer to subtract the impulse portion of the filtered demodulated signal output by the filter from an output of the delay unit to remove the detected impulse. Or the filter may be a linear phase low pass filter to receive the demodulated signal and filter the impulse from the demodulated signal and output the filtered demodulated signal. In such example, the impulse removal circuit is to substitute the filtered demodulated signal for an output of the delay unit to remove the detected impulse.

In another aspect, a method includes: obtaining a first filter sum of a plurality of phase samples of an incoming FM signal; obtaining a second filter value based on the first filter sum and a selected phase sample of the plurality of phase samples; determining whether the second filter value exceeds a threshold value; and responsive to determining that the second filter value exceeds the threshold value, replacing one or more selected phase samples of the plurality of phase samples with the first filter sum.

In a still further aspect, a system includes a receiver to receive and process a FM signal. In turn, the receiver may include: a delay circuit including a plurality of delay units to delay a plurality of phase samples; a filter to filter at least some of the plurality of phase samples and generate a filter output; a detector to determine whether the FM signal includes impulsive noise, based at least in part on the filter output; and a control circuit to replace one or more of the plurality of phase samples within the delay circuit with the filter output if the detector determines that the FM signal includes the impulsive noise, to remove at least some of the impulsive noise from the FM signal.

DETAILED DESCRIPTION

In various embodiments, an impulse detection technique is used that does not rely on derivatives. Embodiments may perform impulse detection in which a signal component is removed from an incoming signal stream. The detection is insensitive to frequency deviation and modulation frequency. Embodiments use a cancellation approach (e.g. subtracting an undesired component from a signal component), rather than performing blanking and interpolation, which can improve performance.

In an embodiment, an impulse cancellation circuit may include an impulse detection portion and impulse cancellation portion. First, impulses and noise are separated from the received signal using an impulse detector. The impulse detector may be implemented as including a linear phase high pass filter. Such detector is insensitive to frequency deviation and modulating frequency. In an embodiment, this detector output does not have a signal component and contains impulses and additive noise. When an instantaneous detector power is greater than a multiple of an average detector power, an impulse is detected. The impulse is then cancelled by removing (e.g., subtracting) the detector output (impulse) from the received signal in the impulse cancellation portion.

Figure 1:
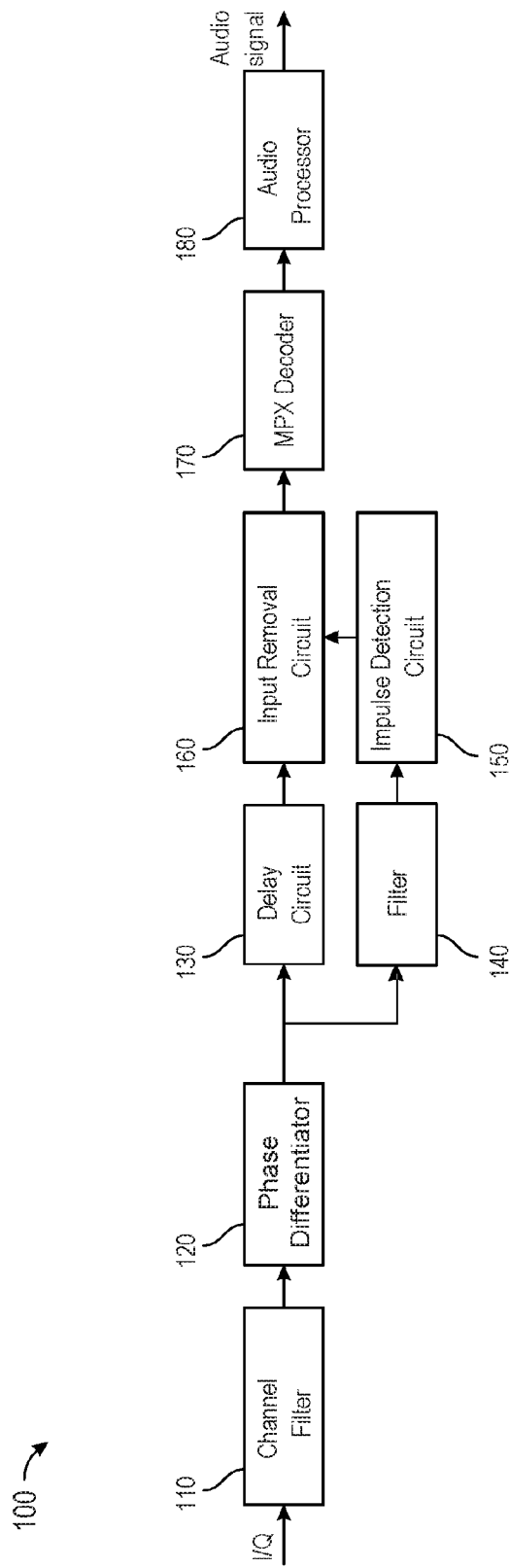
FIG. 1 is a block diagram of a portion of a receiver in accordance with an embodiment.

Referring now to FIG. 1, shown is a block diagram of a portion of a receiver in accordance with an embodiment. More specifically, receiver 100 may be part of a single chip CMOS FM receiver/tuner. For purposes of discussion, the portion of such receiver shown in FIG. 1 is a tuner portion downstream of analog radio frequency (RF) front end processing, downconversion (e.g., to an intermediate frequency (IF) signal) and digitization. Thus as shown in FIG. 1, incoming complex (I/Q) signals are received in a channel filter 110, which performs channel filtering to remove noise and out-of-band information.

After such channel filtering, the channel filtered output is provided to a phase differentiator 120, which can be used to identify a first order difference of an angle or phase difference between two different samples of the I/Q data. This detected angle or phase difference is provided to a delay circuit 130 and a filter 140. As will be described herein, delay circuit 130 may be implemented as an N-stage delay circuit including N-delay elements with selectable control as described herein. In turn, filter 140 may be a linear phase filter. In different embodiments, this linear phase filter may be implemented as a low pass filter or a high pass filter, as desired for a particular implementation.

The output of filter 140 is provided to an impulse detection circuit 150, which may be used to detect an impulse present in the filtered output from filter 140. Different manners of detecting such impulse may occur in different embodiments, such as depending on the type of filter 140 implemented. In any event, impulse detection circuit 150 can detect an impulse and provide control and/or impulse information to an impulse removal circuit 160 coupled to an output of delay circuit 130. In this way, impulse detection circuit 150 may be coupled in a feedforward configuration to impulse removal circuit 160 to remove any detected impulse from the output of delay circuit 130. After removing any detected impulse, the resulting signal, which is a demodulated signal, is provided to a MPX decoder 170 for stereo decoding. Thereafter, the demodulated signal may be provided to an audio processor 180, for further audio processing and output of an audio signal. Understand while shown at this high level in FIG. 1, many variations and alternatives are possible.

Figure 2:
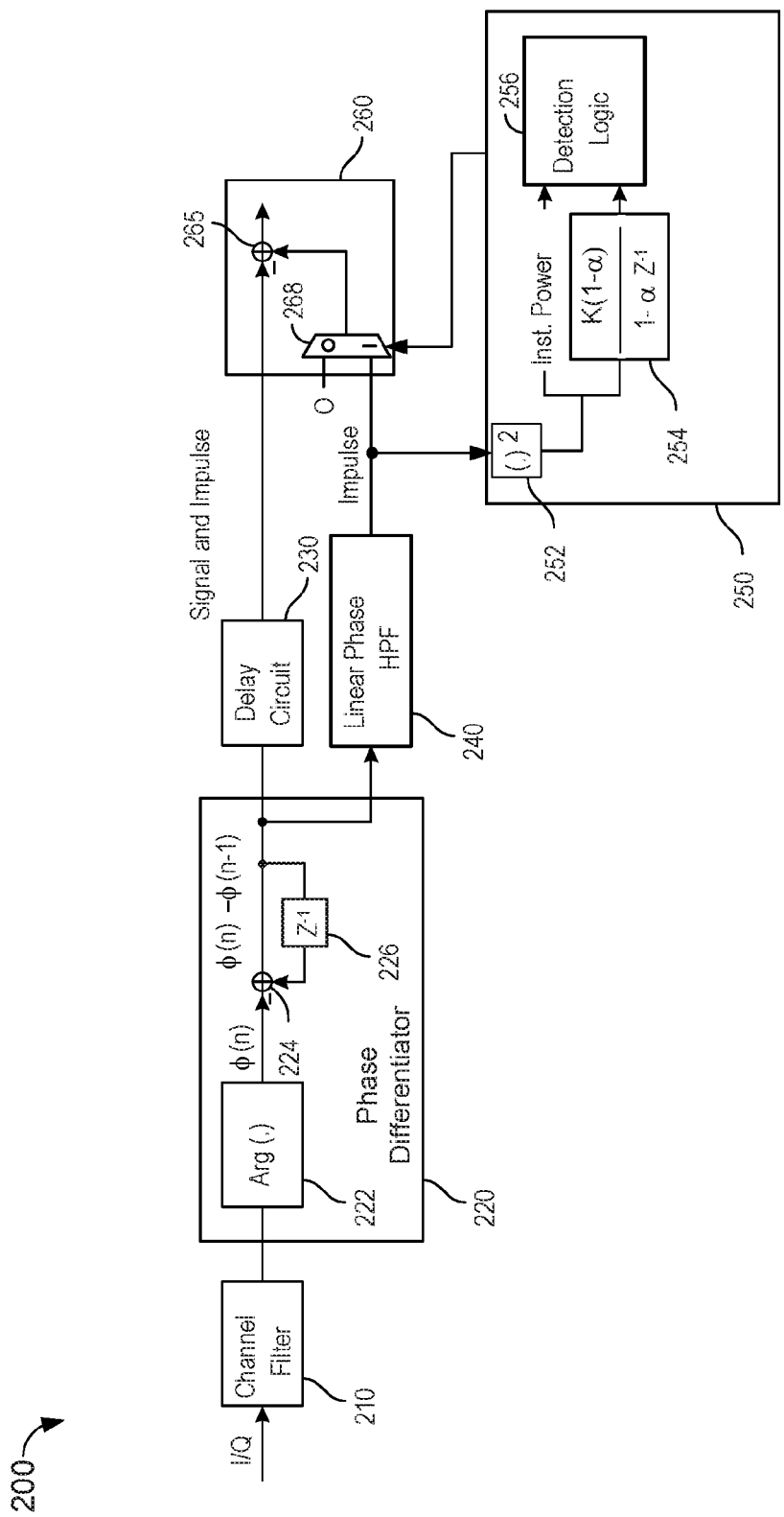
FIG. 2 is a block diagram illustrating further details of a portion of a tuner in accordance with an embodiment.

Referring now to FIG. 2, shown is a block diagram illustrating further details of a portion of a tuner in accordance with an embodiment. As shown in FIG. 2, tuner 200 may be implemented in a manner to provide impulse detection and removal via use of a high pass filter (HPF). As seen, incoming complex signals are provided to a channel filter 210, and thereafter the channel filtered signals are provided to a phase differentiator 220. In the embodiment shown, phase differentiator 220 is formed of a complex angle function 222, a summer 224, and a delay element 226. As such, the output of phase differentiator 220 provides a phase value corresponding to a phase difference between successive samples (e.g., $\Phi(n)-\Phi(n-1)$) of the complex signal.

This phase value is provided to a delay circuit 230 and a filter 240. Delay circuit 230 may be implemented as an N-stage delay circuit including N delay elements. In one embodiment, delay circuit 230 serves to provide a group delay equivalent to that of filter 240. In an embodiment, delay circuit 230 simply outputs incoming samples in a delayed manner such that delay circuit 230 acts as an all pass filter with a given group delay. As such, the output of delay circuit 230 includes signal information and potentially impulse information, where impulses present in the received signal may be due, e.g., to impulsive noise, such as when a receiver is operating in a low signal-to-noise (SNR) environment. As illustrated in FIG. 2, the output of delay circuit 230 is provided to an impulse removal circuit 260, which in the embodiment shown includes a summer 265, which may be configured to remove impulses when detected.

In this embodiment, filter 240 is implemented as a linear phase high pass filter having a high pass transfer function such that any impulse present in the received signal is passed as a filtered output from filter 240 as an impulse. Filter 240 may be configured to have the same group delay as delay circuit 230 (and which may be a constant group delay).

To determine whether an impulse is present in a received complex signal, an impulse detection circuit 250 is coupled to receive the filtered output of filter 240. In the embodiment shown, impulse detection circuit 250 includes a power detector 252, which in an embodiment is implemented as an instantaneous power detector to determine the instantaneous power of the signal output by filter 240. This instantaneous power signal is provided to a detection logic 256 and to an average power detector 254. In one embodiment, average power detector 254 may be implemented as a root mean squared (RMS) power detector to determine an average power and output an average power signal to detection logic 256. More specifically, in an embodiment, average power detector 254 may calculate the average power as: $K(1-\alpha)/(1-\alpha z^{-1})$, namely a z-domain filter response. The filter is computed as $y(n)=(1-\alpha)*x(n)+\alpha*y(n)$, where $\alpha$ determines the filter bandwidth and K is a multiplier factor applied to the average or filtered power.

In various embodiments, detection logic 256 may be configured to compare the instantaneous power signal to the average power signal to determine whether an impulse is present. To this end, detection logic 256 may detect the presence of an impulse if the instantaneous power exceeds the average power. Of course different manners of making this detection are possible. For example in one embodiment, detection logic 256 may compare the instantaneous power to a product of the average power and a coefficient. In an embodiment, this coefficient may be a fixed value. In other cases, average power detector 254 may not be present and instead detection logic 256 may be configured to compare the instantaneous power to exceed a predetermined threshold. Such threshold and/or coefficient may be set based on manufacturing testing and stored into firmware, or in other cases the value can be dynamically updated. In any case, detection logic 256 is configured to operate independently of frequency deviation (volume of FM signal). Stated another way, detection logic 256 operates independently of an amplitude of the incoming RF signal, and any threshold implemented by this detection logic also is independent of frequency deviation.

Still with reference to FIG. 2, if it is determined that the instantaneous power exceeds a multiple of the average power, detection logic 256 may be configured to identify presence of an impulse and provide a control signal to a selector 268. Responsive to this impulse detection signal, selector 268 may be configured to provide the impulse output by filter 240 to summer 265 to thus remove the impulse from the output of delay unit 240, such that the output of summer 265 is the demodulated signal with the detected impulse removed. And instead, if no impulse is detected, no difference input is provided to summer 265, and the delayed output of delay circuit 230 is output without impulse compensation. Understand while shown at this high level in the embodiment of FIG. 2, many variations and alternatives are possible.

Figure 3:
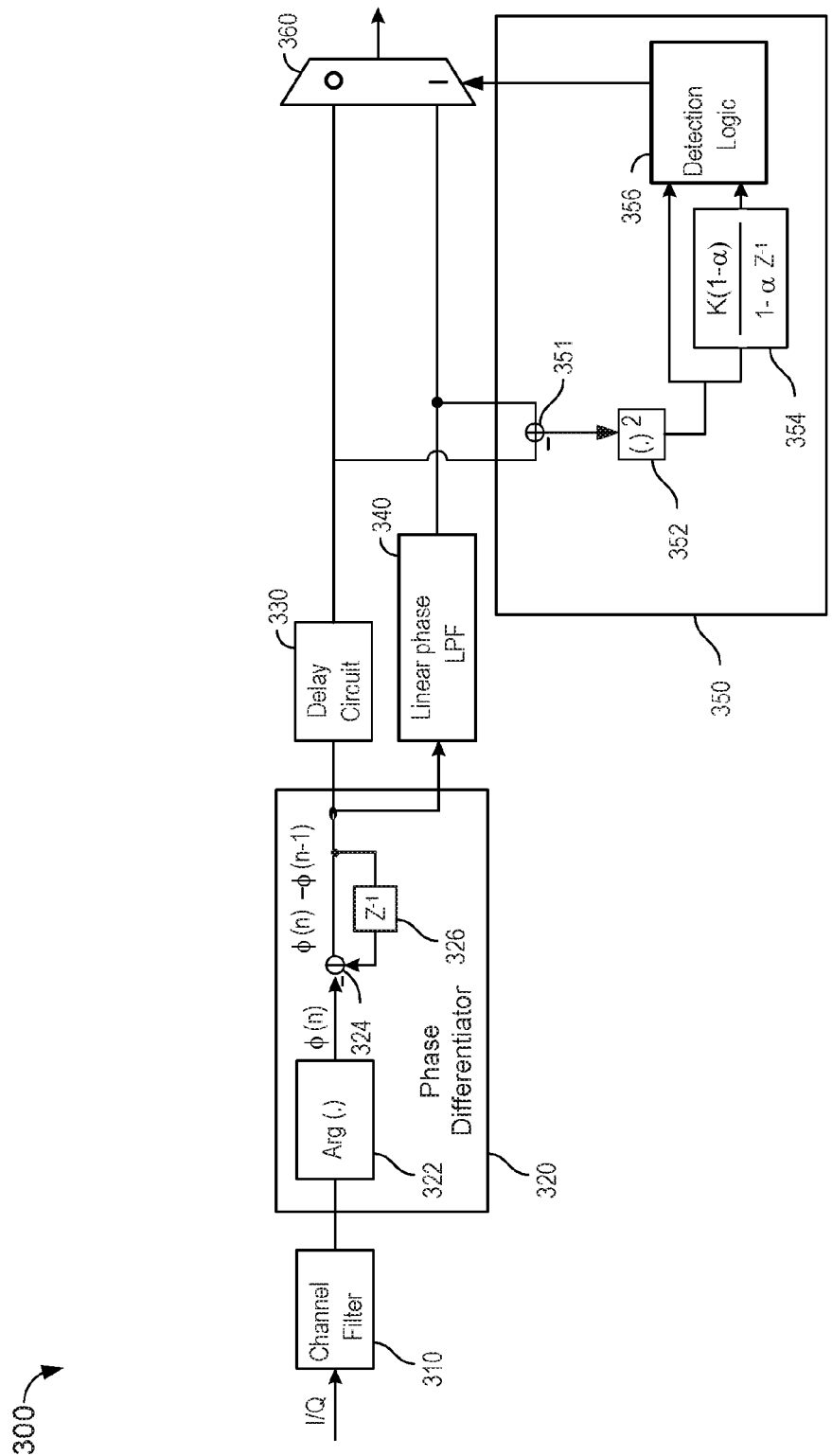
FIG. 3 is a block diagram illustrating further details of a portion of a tuner in accordance with another embodiment.

Referring now to FIG. 3, shown is a block diagram illustrating further details of a portion of a tuner in accordance with another embodiment. FIG. 3 illustrates a tuner 300 which is generally configured the same as tuner 200 of FIG. 2. As such, similarly enumerated elements (although of a "300" series) are used to refer to similar elements as in FIG. 2. However the arrangement in FIG. 3 is with regard to use of a low pass filter (LPF) in place of the HPF of the FIG. 2 embodiment.

Thus a similarly configured front end is present, with a channel filter 310, a phase differentiator 320, a delay circuit 330, an impulse detection circuit 350, and a filter 340. As above, the output of delay circuit 330 is provided to an impulse removal circuit 360. In this embodiment, filter 340 is implemented as a linear phase low pass filter having a low pass transfer function such that an impulse-removed signal is output from filter 340 as an impulse.

To determine whether an impulse is present in a received complex signal, impulse detection circuit 350 is coupled to receive the filtered output of filter 340 and perform a summing operation with the output of delay circuit 330. In the embodiment shown, impulse detection circuit 350 includes a summer 351, to determine a difference between the filter output and at least one sample of delay circuit 330 (e.g., a center sample). This difference signal replicates a high pass filter. As further illustrated, an instantaneous power of this signal is determined in a power detector 352. As above, this instantaneous power signal is provided to a detection logic 356 and to an average power detector 354, to determine an average power and output an average power signal to detection logic 356.

In various embodiments, detection logic 356 may be configured to compare the instantaneous power signal to the average power signal to determine whether an impulse is present, as discussed above. In the embodiment of FIG. 3, if an impulse is detected (e.g., above a threshold level), detection logic 356 may be configured to identify presence of an impulse and provide a control signal to impulse removal circuit 360, which may be implemented as a selector. Responsive to this impulse detection signal, selector 360 may be configured to substitute a given one or more samples output from delay circuit 330 with corresponding samples of the output of filter 340 to thus remove the detected impulse. And instead, if no impulse is detected, the output of delay circuit 330 is output without impulse compensation. Understand while shown at this high level in the embodiment of FIG. 3, many variations and alternatives are possible.

Figure 4:
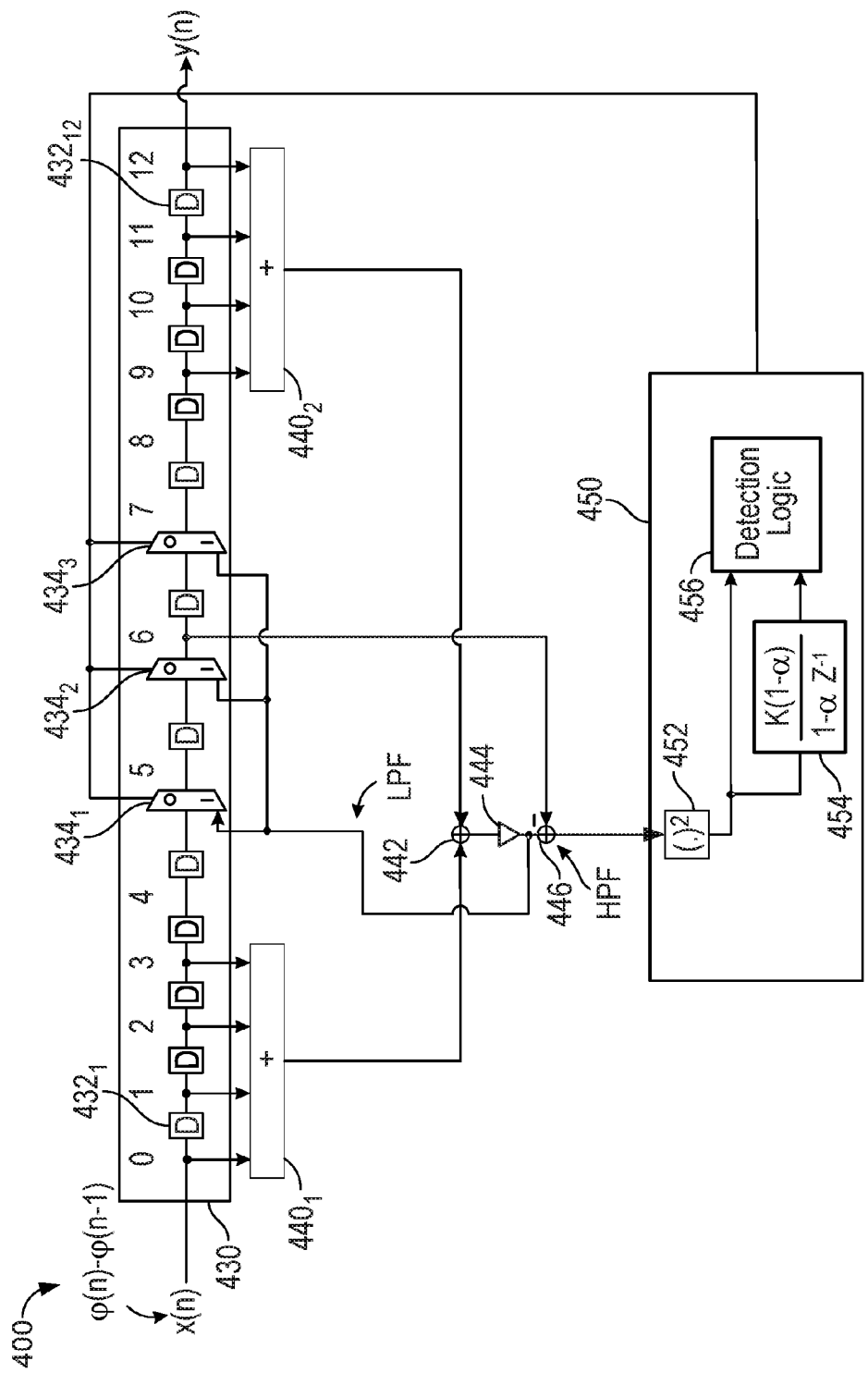
FIG. 4 is a block diagram of an impulse cancellation circuit in accordance with an embodiment.

Referring now to FIG. 4, shown is a block diagram of an impulse cancellation circuit in accordance with an embodiment. More specifically, cancellation circuit 400 shown in FIG. 4 can be implemented in different types of hardware circuitry, including digital circuitry, such as present in a DSP. As illustrated, incoming signal information, e.g., in the form of phase samples x(n), is provided to a delay circuit 430 formed of a plurality of delay elements $432_1$-$432_{12}$. Note that while twelve such delay elements are shown in this particular implementation, different numbers of such elements can be present in other embodiments. As further illustrated, delay circuit 430 also includes multiple controllable selector elements $434_1$-$434_3$, coupled to the outputs of the center delay elements. In an embodiment, selectors 434 can be implemented as multiplexers, although other variations are possible. As described above and below, selectors 434 may be controlled to enable pass through of delayed phase samples in the absence of impulse noise, and instead to replace impulse-impacted phase samples, e.g., with an output of a linear phase filter.

To this end, a linear phase filter can be implemented including multiple adders $440_1$, $440_2$, each of which is configured to sum multiple samples (namely the most recently received samples and the least recently received samples). After summing all of these samples in a summer 442, a scaling circuit 444 may generate an average. In the particular example shown, assuming that eight samples are summed, scaling circuit 444 may perform a divide-by-eight function. The output of scaling circuit 444 may correspond to a low pass filtered version of the phase samples. In turn, by determining a difference between this filter value and a center sample (namely output from selector $434_2$), a high pass filtered output is realized. This high pass filtered value can be provided to an impulse detection circuit 450.

As described above, impulse detection circuit 450 may be configured to detect presence of an impulse by a comparison of an instantaneous power value of this high pass filtered value (as determined in instantaneous power detector 452) with an average power value determined in an average power detector 454. As such, detection logic 456 may be configured to identify presence of an impulse based on comparison of the instantaneous power value, e.g., to a product of the average power value and a coefficient. If such impulse is detected, detection circuit 456 may be configured to output a control signal to selectors $434_1$-$434_3$. Responsive to this control signal, selectors 434 may be configured to substitute the low pass filter output from scaling circuit 444 in place of the corresponding phase samples to remove impulsive noise. Understand that while the implementation shown in FIG. 4 identifies particular samples for substitution, in other cases more or fewer samples may be substituted and further such samples may be located at different points within delay circuit 430. The output of delay circuit 430 is thus an impulse-free modulated signal y(n), which can be provided to further portions of a demodulator.

Figure 5:
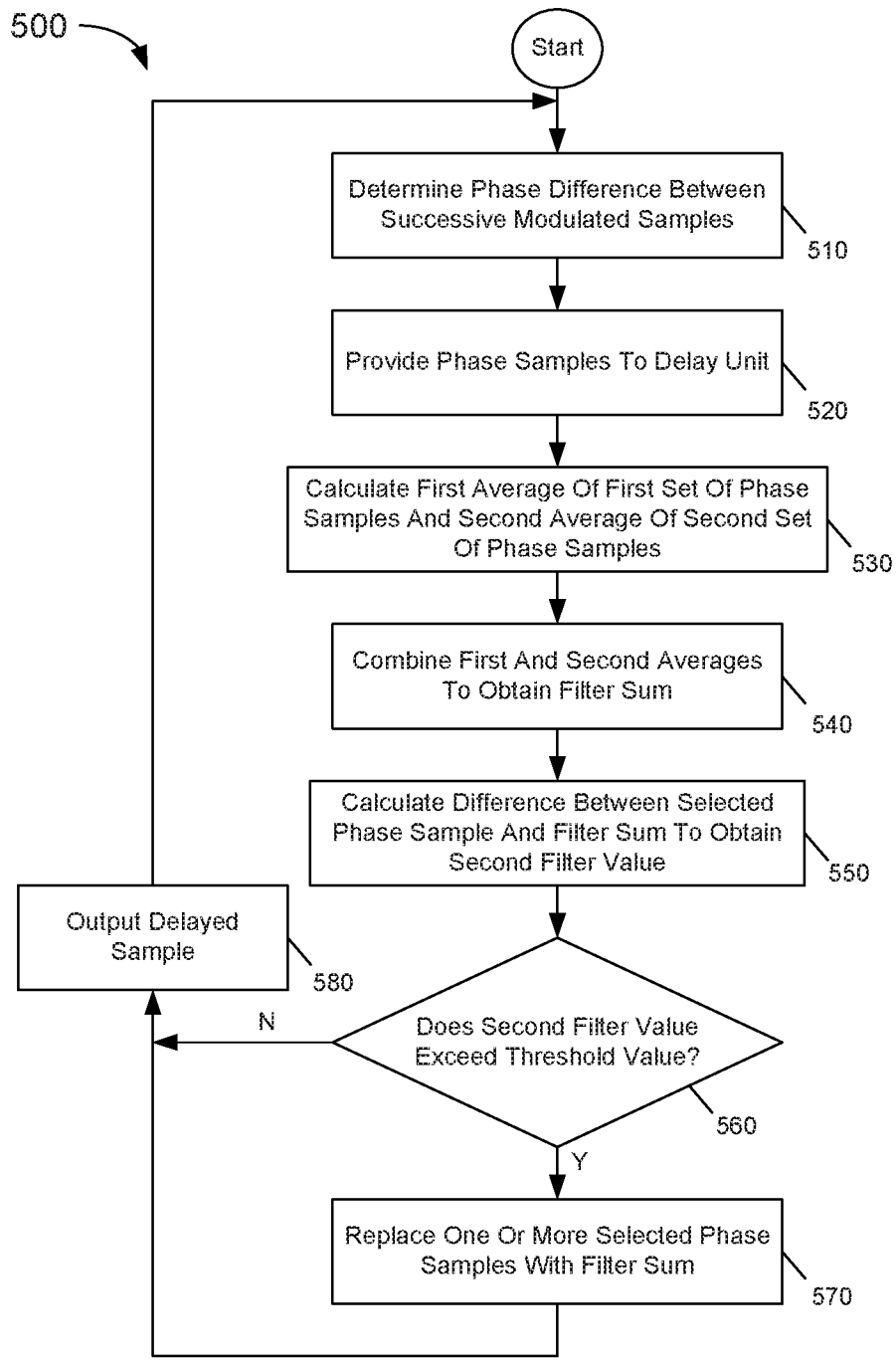
FIG. 5 is a flow diagram of a method in accordance with an embodiment.

Referring now to FIG. 5, shown is a flow diagram of a method in accordance with an embodiment. As shown in FIG. 5, method 500 may be implemented by way of an impulsive noise canceller as described herein, such as one of the hardware circuit embodiments of FIGS. 1-4. In other cases, method 500 may be implemented at least in part by leveraging tuner circuitry to execute instructions, e.g., within a digital signal processor (DSP) of a receiver. As one such example, these instructions may be implemented as firmware stored in a non-volatile or other non-transitory storage of a radio or other system.

In any case, method 500 begins by determining a phase difference between successive modulated samples of an incoming stream (block 510). As an example, these phase samples can be detected by a phase differentiator, as described above. At block 520 these phase samples can be provided to a delay unit. Such delay unit may be implemented in hardware as described above. In other cases, the delay unit can be implemented as a storage, e.g., a buffer to store a set of samples to be processed as described herein.

In any event, control passes next to block 530 where averages of different sets of these phase samples can be calculated. For example, with reference back to FIG. 4, the first set of samples may correspond to most recently obtained phase samples, while the second set of samples may correspond to the least recently obtained phase samples (as obtained within an analysis window).

Control next passes to block 540 where these first and second averages can be combined to obtain a filter sum. Understand that in other embodiments, different manners of obtaining a filter sum, such as using a given hardware filter, digital filter or so forth can be implemented instead. Next at block 550 a difference may be obtained between a selected phase sample and this filter sum to obtain a second filter value. In an embodiment, this selected phase sample may be a center sample of the stored set of the analysis window. As such, this second filter value may be a high pass filtered value of the set of samples.

Next control passes to diamond 560 to determine whether this second filter value exceeds a threshold value. This threshold value can be determined in different ways. In some cases, the threshold value may be a fixed value, e.g., a fixed ratio between an instantaneous power value and an average power value. In other cases, the threshold value may correspond to a dynamically calculated value corresponding to a product of an average value and a coefficient. If it is determined that the second filter value does not exceed this threshold value, no impulse is thus detected, and no further processing is needed. Control then passes directly to block 580 where a given delayed demodulated sample may be output. Namely, the least recent phase sample within the analysis window can be output, and control passes back to block 510.

Otherwise, if an impulse is detected, as when the second filter value exceeds the threshold value, control passes to block 570. At block 570, one or more selected phase samples can be replaced with the filter sum. For example, with reference back to FIG. 4, the three middle demodulated samples can be replaced with the low pass filtered value (namely the filter sum). Of course in other cases, different ones of the delayed samples can be replaced in this manner, and understand further that in other cases, a different value (different than this filter sum) can be used to replace the selected one or more phase samples. After such replacement, control passes to block 580 discussed above. Understand while shown at this high level in the embodiment of FIG. 5, many variations and alternatives are possible.

In an embodiment, an impulse noise canceller can be implemented, e.g., in a firmware of a receiver. Referring now to Table 1 shown is a pseudo-code for impulse noise cancellation as described herein, which may operate in place on the input $x(n)=\Phi(n)-\Phi(n-1)$ as follows:

TABLE 1

```
x1(n) = (1/8) * (x(n) + x(n - 1) + n(n - 2) + x(n - 3))
x2(n) = (1/8) * (x(n - 9) + x(n - 10) + x(n - 11) + x(n - 12))
lpf(n) = x1(n) + x2(n)
hpf(n) = lpf(n) - x(n - 6)
impulse = |hPf(n)|
thr(n) = thr(n - 1) + beta * thr(n - 1) + beta * impulse(n)
if( impulse(n) > K * thr(n)
    x(n - 5) = lpf(n)
    x(n - 6) = lpf(n)
    x(n - 7) = lpf(n)
endif
```

In other embodiments, this pseudo-code may be implemented using the hardware circuit shown in FIG. 4.

Figure 6:
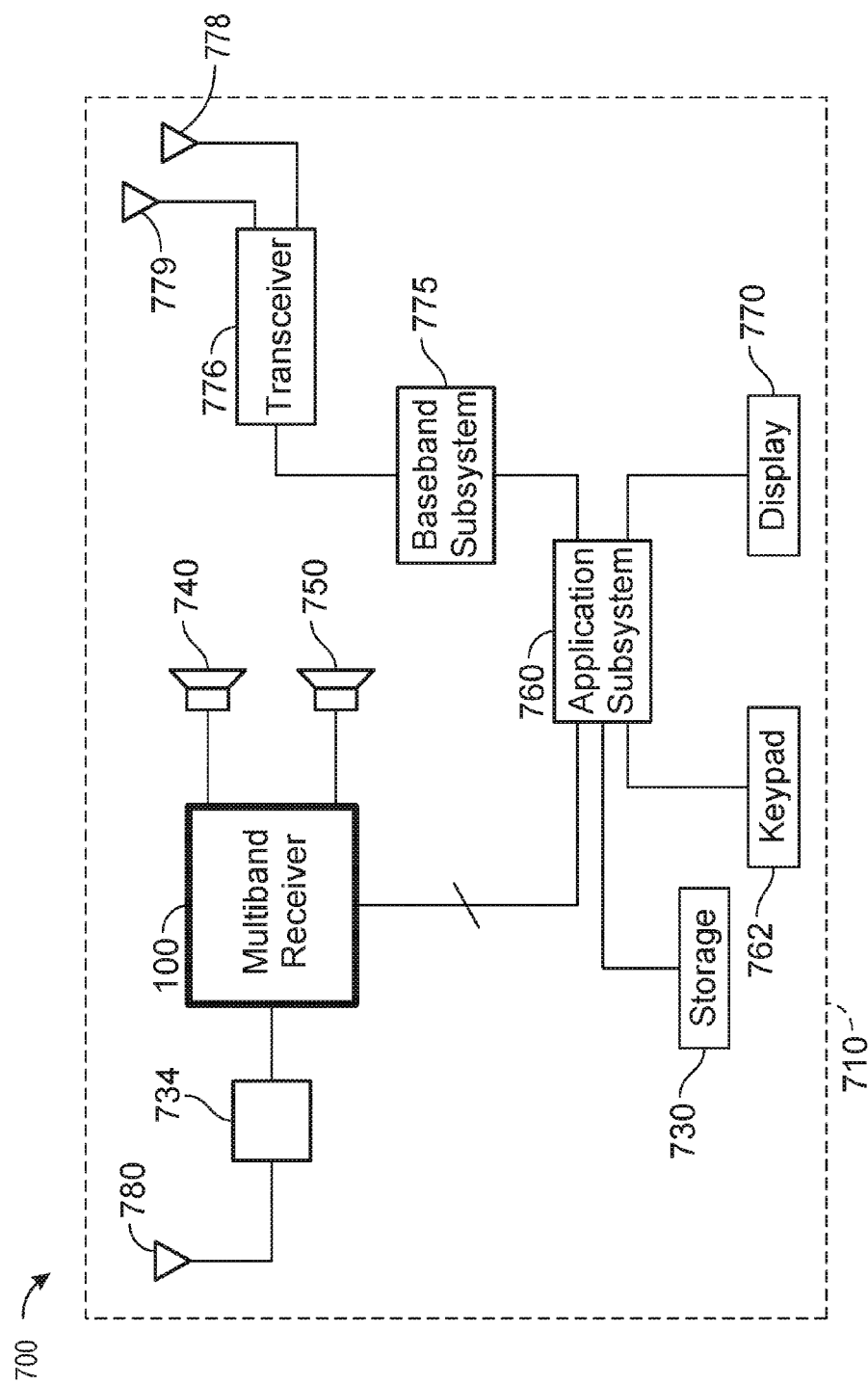
FIG. 6 is a block diagram of a multimedia portable wireless device, which in turn is part of a wireless system.

Referring to FIG. 6, shown is a block diagram of a multimedia portable wireless device 710, which in turn is part of a wireless system 700. In accordance with some embodiments a multiband receiver 100 may include one or more impulse cancellation circuits described herein to remove impulses from demodulated FM samples before communicating information to a downstream decoder, which may be a part of the receiver or a separate decoder or audio processor (not shown in FIG. 6). As examples, the wireless device 710 may be a multi-function, multi-band radio (e.g., of a vehicle entertainment system), cellular telephone, smartphone, PDA, tablet computer, mobile game device, or so forth and may play music or book downloads, and may be part of a wireless link between a satellite antenna and a radio receiver, a terrestrial receiver, etc.

Among its other various functions, the wireless device 710 may store digital content on a storage 730, which may be a flash memory or hard disk drive, as a few examples. The wireless device 710 generally includes an application subsystem 760 that may, for example, receive input from a keypad 762 of the wireless device 710 (which may be a touch pad, e.g., of a display 770) and display information on display 770. Furthermore, the application subsystem 760 may generally control the retrieval and storage of content from the storage 730 and the communication of, e.g., audio from receiver 100. As shown, receiver 100 may be directly connected to speakers 740 and 750 for output of audio data (understand that in some embodiments a separate audio processor may be integrated between the receiver and speakers). As depicted in FIG. 6, the multimode receiver 100 may be coupled by a matching network 734 to a receiver antenna 780.

In accordance with some embodiments of the invention, the wireless device 710 may have the ability to communicate over a communications network, such as a wide area, local area, or personal wireless network. For these embodiments, the wireless device 710 may include a baseband subsystem 775 that is coupled to the application subsystem 760 for purposes of encoding and decoding signals for this wireless network. Baseband subsystem 770 may be coupled to a transceiver 776 that is connected to corresponding transmit and receive antennas 778 and 779.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a delay unit to delay a demodulated signal obtained from an input radio frequency (RF) frequency modulation (FM) signal;
    a filter to filter the demodulated signal and output a filtered demodulated signal;
    an impulse detection circuit to receive the filtered demodulated signal and detect presence of an impulse in the demodulated signal; and
    an impulse removal circuit to remove the detected impulse from the demodulated signal;
    wherein the delay unit comprises:
        a plurality of delay elements to receive, delay and output a sample of the demodulated signal; and
        a plurality of selectors controllable to substitute a sample output from the filter for a sample of the demodulated signal, responsive to detection of the impulse.

2. The apparatus of claim 1, wherein the filter comprises a linear phase high pass filter to filter a signal portion of the demodulated signal and output an impulse portion of the demodulated signal.

3. The apparatus of claim 2, wherein the impulse removal circuit comprises a summer to subtract the impulse portion of the filtered demodulated signal output by the filter from an output of the delay unit to remove the detected impulse.

4. The apparatus of claim 1, wherein the filter comprises a linear phase low pass filter to receive the demodulated signal and filter the impulse from the demodulated signal and output the filtered demodulated signal.

5. The apparatus of claim 4, wherein the impulse removal circuit is to substitute the filtered demodulated signal for an output of the delay unit to remove the detected impulse.

6. The apparatus of claim 1, wherein the impulse detection circuit is to detect the presence of the impulse when the filtered demodulated signal exceeds a threshold value.

7. The apparatus of claim 6, wherein the impulse detection circuit comprises:
    a first power detector to detect an instantaneous power of the filtered demodulated signal;
    a second power detector to detect an average power of the filtered demodulated signal; and a controller to detect the impulse based on the instantaneous power and the average power.

8. The apparatus of claim 7, wherein the impulse detection circuit is to detect the impulse if the instantaneous power exceeds a product of the average power and a coefficient.

9. The apparatus of claim 1, wherein the filter comprises a first filter portion to sum an output of a first subset of the plurality of delay elements and a second filter portion to sum an output of a second subset of the plurality of delay elements.

10. The apparatus of claim 9, wherein the plurality of selectors are coupled between the first subset of the plurality of delay elements and the second subset of the plurality of delay elements.

11. The apparatus of claim 1, wherein the plurality of selectors are interposed between at least some of the plurality of delay elements.

12. A non-transitory computer readable medium including instructions that when executed enable a system to:
 obtain, in a first filter of a receiver, a first filter sum of a plurality of phase samples of an incoming frequency modulation (FM) signal;
 obtain, in a second filter of the receiver, a second filter value based on the first filter sum and a selected phase sample of the plurality of phase samples;
 determine, in an impulse detection circuit of the receiver, whether the second filter value exceeds a threshold value; and
 responsive to a determination that the second filter value exceeds the threshold value, replace one or more selected phase samples of the plurality of phase samples with the first filter sum.

13. The non-transitory computer readable medium of claim 12, further comprising instructions that when executed enable the system to obtain the first filter sum as a first average of a first set of phase samples and a second average of a second set of phase samples.

14. The non-transitory computer readable medium of claim 12, wherein the replacement of the one or more selected phase samples with the first filter sum is to remove an impulse in the incoming FM signal.

15. The non-transitory computer readable medium of claim 12, further comprising instructions that when executed enable the system to determine the threshold value based on an average value of the second filter value.

16. A system comprising:
 a receiver to receive and process a frequency modulation (FM) signal, the receiver comprising:
  a delay circuit including a plurality of delay units to delay a plurality of phase samples;
  a filter to filter at least some of the plurality of phase samples and generate a filter output;
  a detector to determine whether the FM signal includes impulsive noise, based at least in part on the filter output; and
  a control circuit to replace one or more of the plurality of phase samples within the delay circuit with the filter output if the detector determines that the FM signal includes the impulsive noise, to remove at least some of the impulsive noise from the FM signal;
 wherein the delay circuit comprises:
  a plurality of delay elements to receive, delay and output a sample of the plurality of phase samples; and
  a plurality of selectors, wherein at least one of the plurality of selectors is controllable to substitute the filter output for a sample of the plurality of phase samples, responsive to detection of the impulsive noise.

17. The system of claim 16, when the detector comprises:
 a first power detector to detect an instantaneous power of the filter output,
 a second power detector to detect an average power of the filter output; and
 a controller to detect the impulsive noise based on the instantaneous power and the average power.

* * * * *